2,773,850

Patented Dec. 11, 1956

2,773,850

FORTIFIED EMULSION PAINTS CONTAINING A ZIRCONYL COMPOUND

Victor M. Willis, Chicago, Ill., assignor to The Sherwin-Williams Company, Cleveland, Ohio, a corporation of Ohio No Drawing. Application December 20, 1952,
Serial No. 327,156

6 Claims. (Cl. 260—29.7)

This invention relates to the induration of paint films deposited from emulsion paint coating compositions and a method for obtaining indurating effect.

More particularly, this invention relates to improvement of the quality of emulsion paint films by the inclusion therein of a quantity of a zirconium compound sufficient to enhance the general film characteristics of the said emulsion paints.

The emulsion paints of particular interest to this invention are generally classed as of the oil-in-water type. This class of paints makes it possible to reduce the viscosity of the material with tap water and to clean up the brushes and overspray with soap and water. Of this general class of emulsions, only two types are of specific interest to the invention and for purposes of simplicity, are described in relation to the nature of the emulsifying agent used in effecting emulsification of the oil or vehicle phase of the paint system. These useful emulsifying agents are of the anionic and non-ionic category. Generally speaking, the emulsion paints presently in general use are of the anionic type. More recently, however, developments have been created which are entirely of the non-ionic character and which have the particular advantage that they may tolerate relatively large quantities of strongly ionic ancillary components.

In reference to the anionic class of emulsion paints which are of the oil-in-water phase relationship, only the alkaline salts of zirconium have been found suitable for the purposes of this invention. Of these, the most convenient and useful is ammonium tricarbonato zirconylate or, more commonly, ammonium zirconyl carbonate. Ammonium zirconyl carbonate is available commercially in an aqueous solution containing about 12% $ZrO_2$ by weight. A particular advantage of this specific zirconium compound is that it may be used with equal effectiveness in non-ionic as well as anionic emulsion paint systems.

The more commonly available zirconium compounds are strongly acidic and their applicability to the present problem is limited to those emulsion paints which are of non-ionic character. This includes diacetato zirconylic acid or zirconium acetate, $H_2ZrO_2(C_2H_3O_2)_2$; disulfato zirconylic acid or zirconium sulfate, $Zr(SO_4)_2 \cdot 4H_2O$; sodium disulfato zirconylate, $Na_2ZrO(SO_4)_2 \cdot 3H_2O$; zirconium oxychloride, $ZrOCl_2 \cdot H_2O$; basic zirconyl chloride, $Zr_2O_3Cl_2$; etc., all of which are strongly acidic. Unfortunately, the acidic compounds of zirconium cannot, in general, be made alkaline without precipitation of basic zirconium hydrate which compound appears to have little value in enhancing the films deposited from emulsion paints.

It is well known that zirconium will form coordinated complexes with organic compounds such as alpha hydroxy acids and polyhydric alcohols. A number of such complex organic coordinated compounds with zirconium have been made and tested in a variety of emulsion paints. In general, they have proved to be inferior to ammonium zirconyl carbonate and the water insoluble soaps of zirconium illustrated by, but not limited to, zirconium complexes of linseed fatty acids.

In a comparative test, a quantity of a commercially available rubber base latex emulsion paint was divided into four aliquot portions. A different one of each of the following materials was added to a different one of the aliquot portions to provide an equivalent quantity of $ZrO_2$ per unit of volume of emulsion paint. The compounds used for comparative purposes were: (a) ammonium zirconyl carbonate; (b) zirconium linoleate; (c) zirconium tartrate complex and (d) a control sample containing no additive.

Upon subjecting paint-outs of these materials to a wash test after several days drying time, (a) was found to give a value in excess of 1,000 rubs of the wash test device without the film breaking through. Sample (b) broke through at the end of 600 rubs. Sample (c) withstood 200 rubs and the control broke out at the end of 80 rubs. The wash test device is more fully described in U. S. Serial No. 118,192, now U. S. Patent 2,636,829, issued April 28, 1953.

From this test data, it can be seen that organic complexes of zirconium, while effective, are less so than are the preferred class of zirconium compounds described. It is believed that the water soluble nature of the organic portion of the zirconium complexes and the proportion of it relative to the amount of zirconium formed in the complex contributes materially to the rapid breakdown of the film under wash tests. Thus, while the coordinated organic complexes containing zirconium are effective, they are much less efficient than ammonium zirconyl carbonate, for example, in either the anionic or non-ionic emulsion paints, and less effective than the acidic salts of zirconium in the non-ionic class of emulsion paints. From this, it can be seen that the ammonium zirconylates as a general class and particularly ammonium tricarbonato zirconylate or ammonium zirconyl carbonate are preferred for the purposes of this invention; first, because they are universally useful (e. g., in both anionic and non-ionic emulsion paints) and second, because they are of non-acidic nature and will not precipitate as the hydrate in the alkaline or neutral emulsion systems.

The beneficial behavior of zirconium compounds in emulsion paints is not fully understood. Theory is difficult to formulate due to the effectiveness of the zirconium compounds, independent of the nature of the emulsion paint in which they are used. For example, as indicated above, alkaline water soluble zirconium salts of inorganic compounds are effective to increase washability in emulsion paints of both the anionic and non-ionic class. Those of anionic character are most common and are characterized by the use of anionically active agents as emulsifiers. Those of nonionic class are more fully described by Armstrong in copending application, U. S. Serial No. 398,228 filed October 2, 1951, and are characterized by their ability to tolerate large amounts of ionizable inorganic salts, for example, calcium sulfate.

It is well known that zirconium forms water insoluble soaps of the usual long chain fatty acids, and it is surprising to find that, although it also forms insoluble soaps of anionic surfactants in general, its use does not materially interfere with emulsion paint stability during storage and upon application.

Advantages observed in the use of inorganic water soluble ammonium salts of zirconium resides in the acceleration of drying of the film, improved adhesion, an increased ability to withstand early rain, improved odor character when the films are applied in places where the humidity is high and improvement in mildew resistance of the paint film in locations where the problem is acute.

While I do not wish to be bound by theory, the improvement in drying of the paint film and the increase in washability of the films deposited from emulsion paints containing an alkaline, water soluble inorganic salt of zirconium is believed to be related to the following factors. In the first instance, the inorganic salt may react to form insoluble organic salts or soaps with residual acidity of fatty acids present in the oil phase, or with agents used to promote emulsion stability, but this without impairment of emulsion quality of the paint. In the second instance, water insoluble metal salts, added as such, may exhibit drier activity and also act as interstitial water repellents. The presence of surfactants as emulsifying agents is in such quantity that films of emulsion paints are, or appear to be, readily wetted. However, there is some evidence that dried films containing the zirconium compounds described do not imbibe water as freely as their zirconium-free comparative counterparts. Traces of detergents are known to undo the general water repellent action of the zirconium salts, and it is, therefore, somewhat anomalous to find their effectiveness in the presence of these compounds.

An odd behavior has been observed in certain emulsion paints where said paints contain large amounts of iron oxide, e. g., 60–100# per 100 gallons of paint. In these cases, the zirconium compounds are not effective at the levels herein employed. If small amounts of iron oxide, e. g., 5 to 15 lbs. per 100 gallons are used (as, in the usual shading of paints for color) no detrimental differences have been observed.

The nature of the dispersed film-forming or vehicle phase may be varied as is well known in the art of formulation of emulsion paints. Illustrative of materials which may constitute the disperse phase of emulsion paint systems are drying oils, bodied drying oils, drying oils in which a portion of resin has been dispersed, usually by heating (sometimes referred to as oleoresinous varnishes), drying oil modified alkylds, nitrocellulose and ethyl cellulose solutions and a variety of emulsion copolymers, particularly styrene-butadiene reverse rubbers, vinyl chloride-vinyl acetate copolymers, vinyl acetate-vinyl alcohol copolymers, etc.

Lacking a suitable descriptive adjective to describe the nature of films deposited from emulsions of the class described above, they are herein referred to as "stet" films. The term "stet," as adapted herein to limit the nature of the film, is meant to include only those films formed from emulsion systems wherein the film-forming material is in the dispersed phase and where the films formed from such emulsion systems are immobile or fixed (as are dried films from conventional paints) and which possess the quality of continuity as opposed to films containing non-drying oils, greases, unplasticized styrene latices, etc., which can be considered as solid films but which may be movable under relatively low shear, exhibit consistency, are non-continuous, are non-adhesive and otherwise lack those qualities of a film essential to the usual concept of film as it relates to and is generally employed in the decorative and protective coating art.

Heretofore, emulsion paints have been formulated which developed, after an appropriate period of drying and aging, a surprising film integrity. Emulsion paint films have been formuated for use on interior exposure which have a promising useful life. However, a particularly difficult problem has curtailed development relative to exterior usage of emulsion paints and it relates to the critical period of drying immediately following the application of the paint to exterior wall areas. Thus an emulsion paint after thorough drying may be quite durable, but if there should be a hard rain shortly after application, the coating tends to reemulsify and be washed away. Extensive use in warmer areas of the globe where heavy rains sometimes occur almost immediately after application of the paint to a wall area, has been limited because of this early sensitivity. Under this situation, paint films may be washed from the wall by the beating of the rain. This, of course, is an extremely objectionable feature as much labor, time and material may be thereby lost.

A principal object of this invention has been to overcome the primary or initial sensitiveness of the freshly applied emulsion paint films to premature rainfall or to rainfall before the film by exposure to the ambient atmosphere has had an adequate opportunity to become irreversibly fixed.

More particularly, this invention has for its object the provision of a means of preventing washoff of freshly applied emulsion paints by including as an essential component of the emulsion paint system a quantity of a zirconium compound sufficient to enhance the water-resistance of a freshly deposited film of the emulsion paint.

In the preferred form of this invention, it provides for an improved emulsion paint composition capable of depositing a stet film which emulsion paint comprises a continuous aqueous phase, a dispersed film-forming phase, and a quantity of a water soluble inorganic salts of zirconium sufficient to yield from about 0.20 to about 2.0 pounds of $ZrO_2$ per 100 gallons of emulsion paint in a ready-to-apply state of viscosity or form.

The following examples are illustrative of practice of the invention:

STABILIZER SOLUTION "A"

75 parts dried acid precipitated casein and 412 parts of water were weighed into a jacketed vessel equipped with an agitator. The temperature of the slurry was increased to 160 degrees F. after which 10 parts of sulfonated tallow and 8 parts of sodium pentachlorophenol, 5 parts of borax and 5 parts of 26 degree Baumé ammonia were added and stirred into the aqueous solution. Thereafter the temperature was increased to 170 degrees F. and held for a half hour. This solution was then drawn off for use in the preparation of some of the following examples.

STABILIZER SOLUTION "B"

380 parts of water and 60 parts of dried soya protein [1] were weighed into a jacketed mixing vessel. The temperature of the slurry was increased to about 150 degrees F. and 15 parts of sulfonated tallow and 8 parts of sodium orthophenylphenate, 2.5 parts of caustic soda and 7.5 parts of boric acid were added. Thereafter the temperature was increased to 165 to 175 degrees F. and held for a half hour. The prepared protein solution was drawn off for later use in the formulation of latex paints.

EXAMPLE 1

*Interior oleoresinous emulsion paint*

300 parts of Stabilizer solution "B" were weighed into a jacketed mixing vessel along with 2 parts of diglycol oleate and 95 parts of water. To the aqueous protein solution were added:

150 parts lithopone
125 parts $TiO_2$
100 parts china clay
100 parts diatomaceous silica
150 parts calcium carbonate After a short period of agitation of the aqueous pigment protein mix, 170 parts additional of Stabilizer solution "B" were added. After thorough incorporation of the added protein solution, 60 parts of oily vehicle containing soya bean oil, tall oil and rosin in the ratio of approximately 7:2:1 containing 1 part of 24% lead naph-

---

[1] Drackett 220 orthoprotein.

thenate and 4 parts of 6% naphthenate were added to the pigment protein slurry and thoroughly incorporated. 3 parts of soya bean lecithin were added and the pH of the system adjusted to approximately 8.9 with aqueous ammonia. The entire batch was passed through a zone of high shear, e. g., a colloid mill into another jacketed agitator tank. At this point, 75 parts of mica were added and incorporated into the emulsion paint product by stirring.

The completed batch was split in half and to one half was added 7.5 parts of ammonium zirconyl carbonate. The portion of the batch containing ammonium zirconyl carbonate was labeled Batch "A" and that not containing ammonium zirconyl carbonate labeled Batch "B."

EXAMPLE 2

Interior oil-modified latex paint 100 parts lithopone
150 parts rutile $TiO_2$
2 parts ferrite yellow
2 parts black iron oxide
40 parts mica
65 parts clay
60 parts lorite (25% calcium carbonate and 25% diatomaceous silica [2])
3 parts sodium salt of alkyl aryl sulfonate
2 parts tetra sodium pyrophosphate
175 parts soya protein Stabilizer solution "B"
188 parts water were thoroughly mixed together. Thereafter 45 parts of four-minute heat bodied linseed oil, 1 part of 25% lead naphthenate, 3 parts of 6% cobalt naphthenate and 4 parts of pine oil were added to the pigment slurry. After incorporation of the oils and driers, the pigment slurry was passed through a zone of high shear (e. g., a colloid mill) into a thin-down vessel. Thereafter 300 parts of a paint latex were mixed into the milled emulsion. The paint latex contained 200 parts of a 45% solids emulsion copolymer containing approximately 60% styrene and 40% butadiene [3].

A paint latex has been defined as a product of emulsion polymerization in an aqueous system, having such physical characteristics as to allow its formulation into a pigmented emulsion system which, when applied and allowed to dry, yields a continuous paint film.

The above batch was split into 7 equal parts and to 1 part no additions were made. The part was labeled Batch "C." The next portion was labeled Batch "D" and ammonium zirconyl carbonate was added thereto in the amount of 1 pound per 100 gallons of product. The next portion was labeled "E" and ammonium zirconyl carbonate was added in the proportion of 3 parts per 100 gallons. The next portion was labeled "F" and the additive was employed to the extent of 5 pounds per 100 gallons. The next portion was labeled "G" and 7 pounds of the additive were used on the same basis. The next portion was labeled "H" and 9 pounds of the additive were so employed. To the sixth portion, ammonium zirconyl carbonate was added to the extent of 11 pounds per 100 gallons and labeled "I." The last portion was labeled "J" and the same inorganic salt complex employed to the extent of 13 pounds per 100 gallons.

EXAMPLE 4

Non-ionic emulsion paint 2250 pounds of varnish maker's linseed oil were heated to 300 degrees F. and 750 pounds of pentaerythritol ester of a maleic rosin adduct resin were added to the hot oil.

[2] National Lead Company.
[3] Dow Chemical Company 529 K.

Temperature was increased to between 550 to 600 degrees F. and held for a body of from 6 to 8 minutes in a Gardner tube. The resulting varnish had a cure of 51 seconds, color of 10 and an acid value of from 10 to 20 at 100 percent solids. Optionally, 5 percent by weight of d-limonene or pine oil may be added to the above varnish solids.

| Lbs. per 100 Gals. | Material | Percent by Volume |
|---|---|---|
| 115 | Titanium-calcium pigment (30% $TiO_2$–70% $CaSO_4$). | 4.0 |
| 205 | Titanium dioxide pigment | 6.0 |
| 40 | Lorite (Inert pigment) (Diatomaceous earth—$CaCO_3$). | 1.5 |
| 8 | Sodium cellulose glycollate (Medium viscosity—400–600 cps. viscosity grade). | |
| 18 | (1) Non-ionic surface active agent Polyethylene glycol monoalkyl ether (U. S. Patent 1,970,578). | |
| 4 | (2) Non-ionic surface active agent Dialkylolamine monoalkyl condensate (U. S. Patent 2,089,212). | |
| 95 | Varnish above | 11.9 |
| 3 | Cobalt naphthenate drier (6% metal) | |
| 5 | Lead naphthenate drier (24% metal) | |
| 10 | Emulsified sulfonate tallow (Anti-foam agent) | |
| 570 | Water | |

The pigmentary materials, sodium cellulose glycolate, and the non-ionic emulsifying agents are weighed into a pony mixer pan and 165 pounds of water were added thereto. The resulting stiff paste is allowed to mix for 15 to 20 minutes after which the anti-foam agent is blended in. The cobalt and lead driers are mixed with the varnish and the prepared varnish vehicle is added slowly to the paste, which is again mixed for another 15 to 20 minutes. An additional 165 pounds of water are added to the resultant mixture and the entire contents of the pony mill pan are passed through a colloid mill, set so that the clearance between the rotor and stator is approximately 0.005 to 0.007 of an inch. Thereafter, the remaining water is added to the milled paste or sufficient of it as is necessary to bring the viscosity of the resultant product to a predetermined good brushing level, e. g., 9 to 11 seconds on Sherwin-Williams viscosity cup.

The above batch was divided into two aliquot portions. The first aliquot was labeled Batch "K" and no additions were made. The second aliquot, labeled "L" and sodium zirconyl sulfate $Na_2ZrO_2(SO_4)_2 \cdot 3H_2O$ was added at the rate of 5 pounds per 100 gallons.

EXAMPLE 5

A quart sample of a commercial latex type interior emulsion paint was purchased on the open market. To 1 pint of the material, ammonium zirconyl carbonate was added in an amount equivalent to 10 pounds per 100 gallons of finished product. This aliquot portion was labeled as "M." The second pint was untreated and the batch labeled "N."

Test procedure

All of the above samples were prepared for applications by brush. This was done by reduction of the viscosity through addition of increments of water, where necessary, to a standard level.

Each of the paint samples was then applied by brush to a series of Upson board panels of 12″ x 24″ dimension. Two coats of the test paint weighing 20 grams wet were applied over each panel. The panels were each divided into three equal areas for wash test purposes.

The following table illustrates the improvement obtained in the washability of the coatings tested by use of water soluble zirconium compounds as compared to a standard.

TABLE I

| Sample Tested | Additive | Amount, #/100 gal. | Washability—(Rubs) 1 day | Washability—(Rubs) 2 days | Other |
|---|---|---|---|---|---|
| A | Ammonium zirconyl carbonate. | 15 | 30 B | | 190 |
| B | None | 0 | 20 B | | 90 |
| C | do | 0 | 200 B | 300 B | |
| D | Ammonium zirconyl carbonate. | 1 | 300 B | 800 B | |
| E | do | 3 | 800 B | 1,000 NB | |
| F | do | 5 | 1,000 NB | 1,000 NB | |
| G | do | 7 | 900 B | 1,000 NB | |
| H | do | 9 | 1,000 B | 900 B | |
| I | do | 11 | 1,000 B | 1,000 NB | |
| J | Ammonium zirconyl carbonate. | 13 | 1,000 B | 1,000 NB | |
| K | None | 0 | 140 B | 400 B | |
| L | Sodium zirconyl carbonate. | 5 | 1,000 B | 1,200 NB | |
| M | Ammonium zirconyl carbonate. | 10 | 1,000 NB | | |
| N | None | 0 | 350 B | | |

B=Oscillations at which break in coating was detected.
NB=No break in coat observable at this number of oscillations.

EXAMPLE 6

Outside masonry emulsion paint

Into equipment similar to that used in Example 1 were weighed 350 parts of Stabilizer solution "A."

4 parts sodium alkyl aryl sulfonate [4]
2 parts sodium naphthalene sulfonate [5]
155 parts Anatase $TiO_2$
75 parts basic carbonate of white lead
150 parts lithopone
75 parts pyrophyllite
100 parts china clay
117 parts water
50 parts diatomaceous silica
8 parts linseed oil fatty acids
2 parts of aqueous ammonia
173 parts soya bean oil-modified glycero phthalate alkyd varnish of 100% solids containing 25% phthalic anhydride and 62% soya bean oil having an acid value of 10 containing 4 parts of 24% lead naphthenate and 4 parts of 6% cobalt naphthenate.

After thorough incorporation of the alkyd into the casein pigment dispersion, the entire batch was passed through a zone of high shear, e. g., a colloid mill into a receiving vessel whereupon 75 parts of mica were added to the batch and thoroughly incorporated therein by additional mixing along with 1.5 parts of dichlorophene.[6] The pH of the batch was adjusted to between 8.7 and 9.1.

The emulsion paint product of Example 6 was split into two parts. To one part was added the equivalent of one pound of $ZrO_2$ per 100 gallons of ready-to-apply fluid paint as a 12% aqueous solution of ammonium zirconyl carbonate. The second part was retained in original state as a control sample.

Each aliquot portion was tested by painting out 8" x 6" of Upson board, allowed to dry for one hour and 30 minutes and then subjected to an artificial rain test devised as follows:

A large separatory funnel was mounted in a ring stand directly over a panel supporting bracket adapted to hold test panels at an angle of 45 degrees to the horizon. A capillary tube was attached to the exit tip of the separatory funnel so that the distance from the orifice of the capillary tube to the panel rack was 14½ inches. The bore of the capillary was such as to permit four quarts of water under constant head to drain off in 7 minutes.

Panels, after drying for initial test periods, depending upon the severity of test are placed on the rack, painted side up, and subjected to the stream of water from the separatory funnel and the capillary tip. In this particular test, the panel painted with the zirconium salt withstood a five quart (10 min. approx.) test without showing washoff of the film. The control, containing no additive, was completely removed at the point of impact of the falling stream in less than two minutes of test duration.

Severity of the test can be increased by decreasing the time elapsed from time of application to time of testing. The time of duration of the test and the heighth of fall can also be varied. It is preferred to hold the heighth constant for comparative purposes, however.

Having thus described my invention, both broadly and in its preferred form, I claim:

1. In an oil-in-water emulsion coating composition characterized by a dispersed oil phase capable of depositing stet films, a continuous water phase and a minor proportion of at least one surface active agent of the anionic class and a pH greater than 7, the improvement which includes the addition of a quantity of a water soluble ionizable, non-pigmentary, non-refractory inorganic ammonium salt of zirconium equivalent to not more than about ten pounds of $ZrO_2$ per 100 gallons of the emulsion paint product.

2. As in claim 1, where the zirconium salt is ammonium zirconyl carbonate.

3. In an oil-in-water emulsion coating composition characterized by a dispersed oil phase capable of depositing stet films, a continuous water phase and a minor proportion of at least one surface active agent of the anionic class and a pH greater than 7, the improvement in the composition which includes a quantity of a water soluble non-refractory, ionizable inorganic ammonium salt of zirconium equivalent to from about 0.2 to 2.0 pounds of $ZrO_2$ per 100 gallons of the emulsion paint product.

4. As in claim 3, where the zirconium salt is ammonium zirconyl carbonate.

5. As in claim 3, wherein the dispersed oil phase is a copolymer of a major proportion of styrene and a minor proportion of butadiene and the zirconyl compound is ammonium zirconyl carbonate.

6. As in claim 4, where the dispersed oil phase is a drying oil modified alkyd resinous varnish and the zirconyl compound is ammonium zirconyl carbonate.

References Cited in the file of this patent

UNITED STATES PATENTS

| | | |
|---|---|---|
| 2,132,997 | Plechner | Oct. 11, 1938 |
| 2,273,872 | Kinzie | Feb. 24, 1942 |
| 2,393,874 | Trent | Jan. 29, 1946 |
| 2,450,534 | Voet | Oct. 5, 1948 |
| 2,492,959 | Blumenthal | Jan. 3, 1950 |
| 2,597,872 | Iler | May 27, 1952 |
| 2,636,829 | Smith et al. | Apr. 28, 1953 |

---
[4] Nacconal NRSF—General Aniline & Film Corp.
[5] Tamol N—Rohm & Haas.
[6] Sindar Corporation G-4.